(12) United States Patent
Kimura et al.

(10) Patent No.: US 7,827,319 B2
(45) Date of Patent: Nov. 2, 2010

(54) INTERACTIVE CONTROL APPARATUS USING REMOTE CONTROL SIGNAL BETWEEN COMPUTER AND ELECTRIC HOME APPLIANCE

(75) Inventors: Masatoshi Kimura, Kawasaki (JP); Kazuhiro Takeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 222 days.

(21) Appl. No.: 11/930,558

(22) Filed: Oct. 31, 2007

(65) Prior Publication Data
US 2008/0172504 A1 Jul. 17, 2008

(30) Foreign Application Priority Data
Jan. 12, 2007 (JP) ............................. 2007-005183

(51) Int. Cl.
*G06F 17/00* (2006.01)
(52) U.S. Cl. .................................. 710/5; 710/2; 710/15
(58) Field of Classification Search .................. 710/5, 710/65; 709/228; 725/37, 58; 340/825.22
See application file for complete search history.

(56) References Cited

U.S. PATENT DOCUMENTS

| | | | | |
|---|---|---|---|---|
| 7,135,985 | B2 * | 11/2006 | Woolgar et al. | 340/825.22 |
| 7,562,242 | B2 * | 7/2009 | Hori | 713/324 |
| 7,565,530 | B2 * | 7/2009 | Kwak et al. | 713/156 |
| 2005/0165967 | A1 * | 7/2005 | Woolgar | 710/1 |
| 2006/0280055 | A1 * | 12/2006 | Miller et al. | 369/44.11 |
| 2007/0177466 | A1 * | 8/2007 | Ando et al. | 369/13.01 |
| 2008/0030624 | A1 * | 2/2008 | Chang | 348/730 |
| 2008/0074411 | A1 * | 3/2008 | Yamashita | 345/211 |
| 2008/0082841 | A1 * | 4/2008 | Juenemann et al. | 713/300 |
| 2008/0098426 | A1 * | 4/2008 | Candelore | 725/38 |
| 2008/0138032 | A1 * | 6/2008 | Leyendecker et al. | 386/66 |
| 2008/0168504 | A1 * | 7/2008 | Yamada et al. | 725/58 |
| 2008/0232209 | A1 * | 9/2008 | Vergoossen et al. | 369/47.5 |
| 2008/0247544 | A1 * | 10/2008 | Candelore et al. | 380/241 |

(Continued)

FOREIGN PATENT DOCUMENTS

JP 9-311750 12/1997

(Continued)

OTHER PUBLICATIONS

HDMI, Hi-Definition Multimedia Interface Specification Version 1.3a, Nov. 2006, pp. 1, 8123-8124, CEC-33.*

*Primary Examiner*—Cheng-Yuan Tseng
(74) *Attorney, Agent, or Firm*—Fujitsu Patent Center

(57) ABSTRACT

An interactive control system using a remote control signal in accordance with HDMI-CEC standards between a computer and an electric home appliance performs power supply control and screen display from a PC to a television, power supply control from the television to the PC, and application control on the PC. In the system, a personal computer (PC) is loaded with a controller capable of operating by a standby power supply. The remote control signal of a PC remote controller is input to an HDMI unit connector of a television through a photoreceiver controller of a PC, a USB/CEC power-on signal connector, a CEC unit connector, a signal line a, an HDMI unit connector, and a cable. The remote control signal of a TV remote controller is input to the cable, the HDMI unit connector, the CEC unit connector, a USB power supply connector, and a USB data processing unit.

14 Claims, 6 Drawing Sheets

U.S. PATENT DOCUMENTS

2009/0041438 A1*  2/2009  Kuno .................... 386/126
2009/0044219 A1*  2/2009  Katou et al. ............ 725/37
2009/0051650 A1*  2/2009  Shintani et al. ........ 345/158
2009/0157885 A1*  6/2009  Takatsuji et al. ....... 709/228

FOREIGN PATENT DOCUMENTS

| JP | 10-133636 | 5/1998 |
| JP | 11-15590 | 1/1999 |
| WO | WO-2006/109581 | 10/2006 |

* cited by examiner

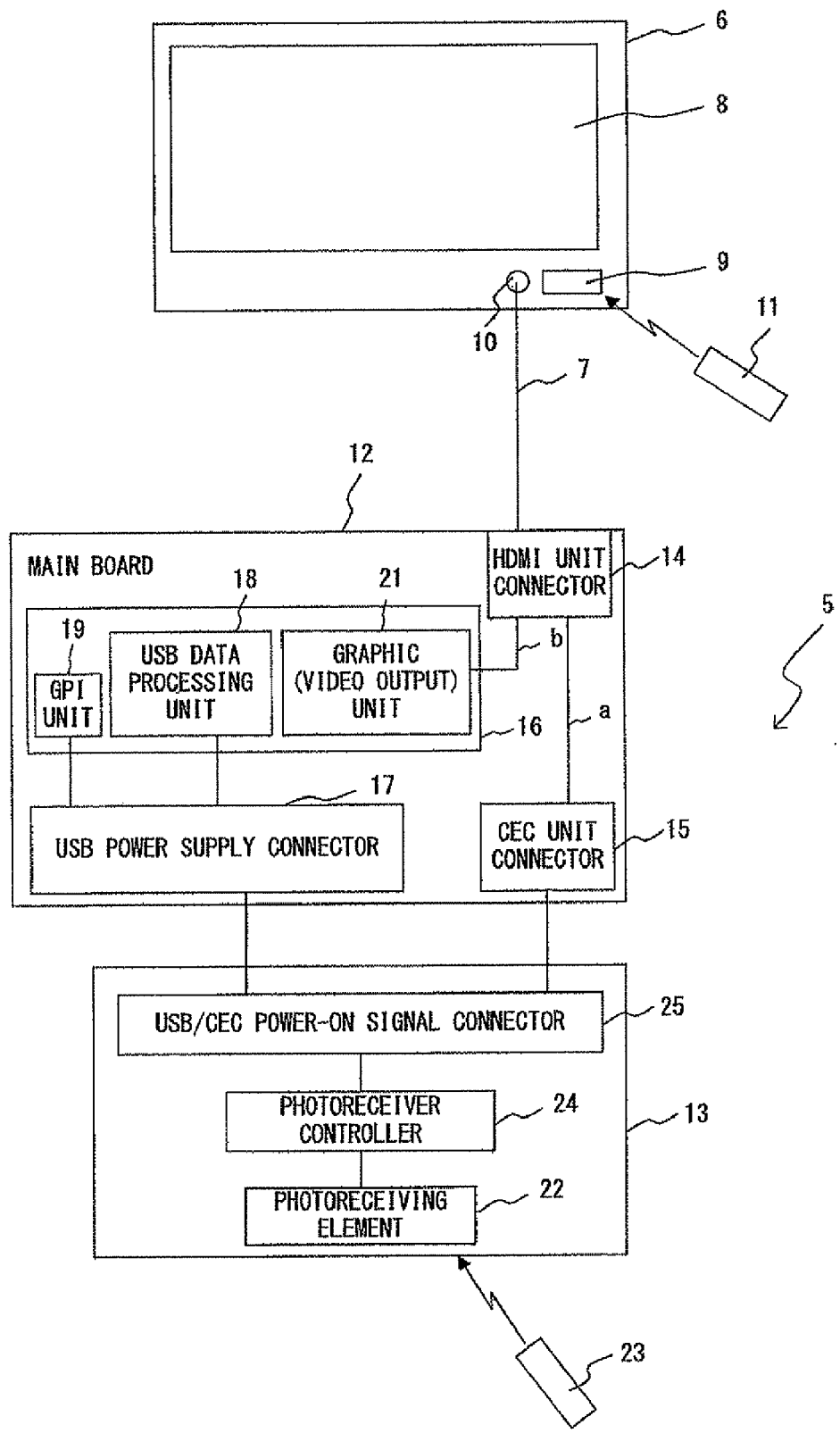
F I G. 2

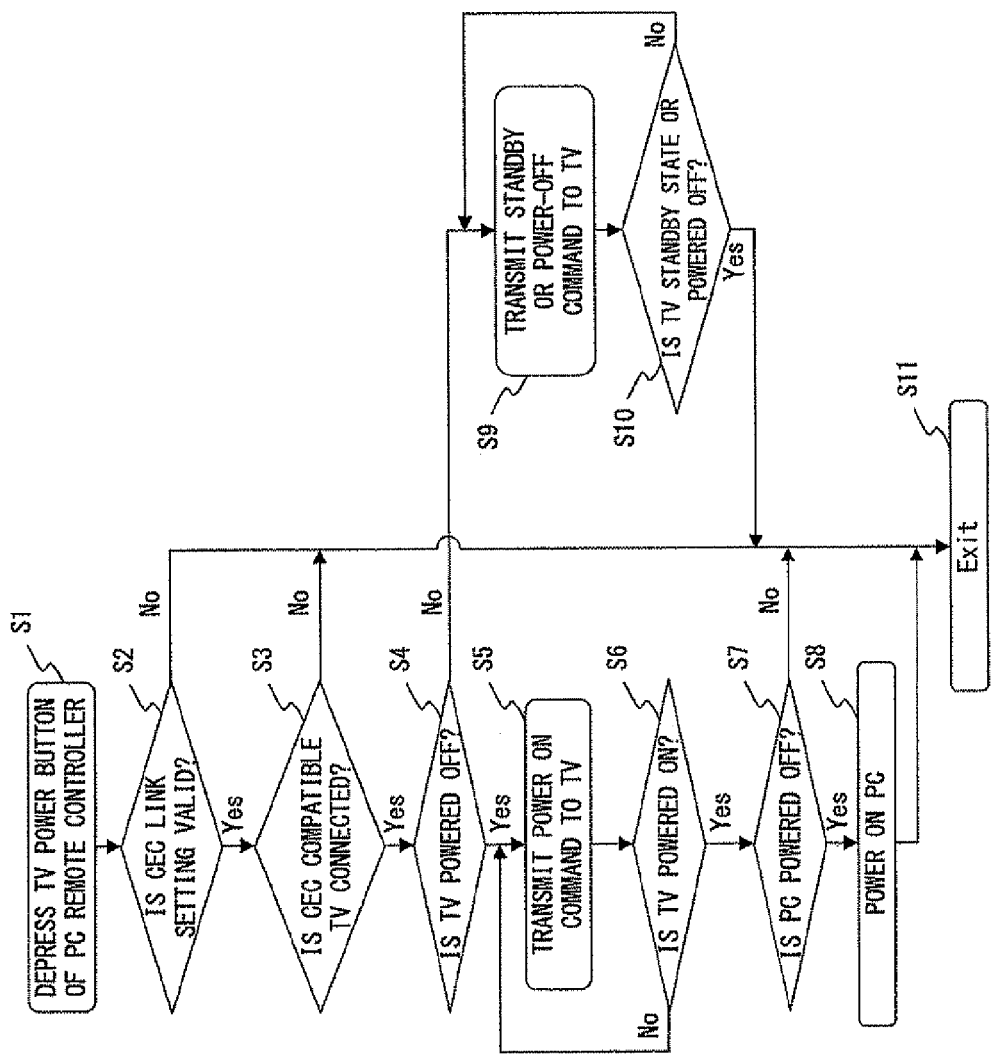
F I G. 3

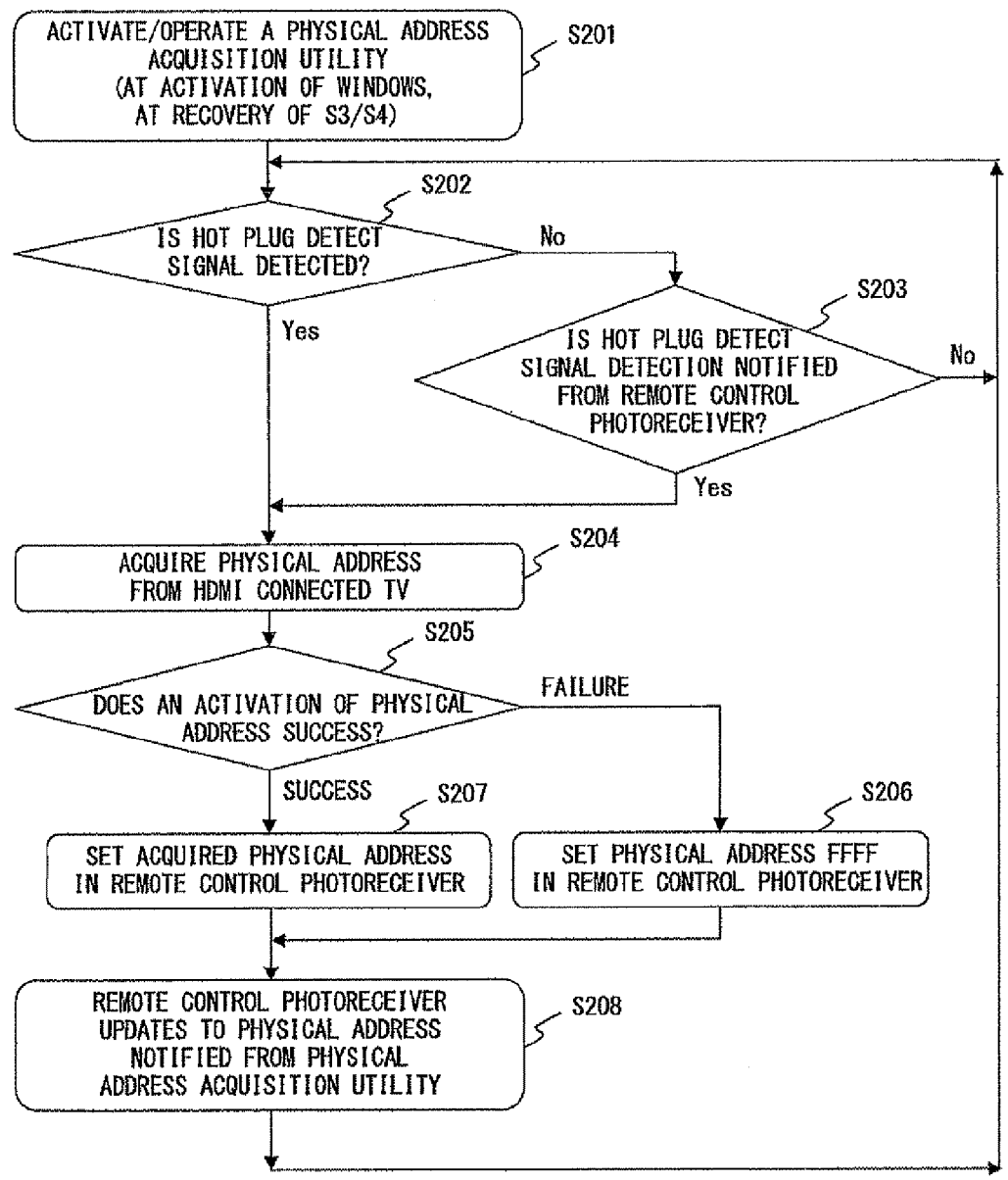
F I G. 5

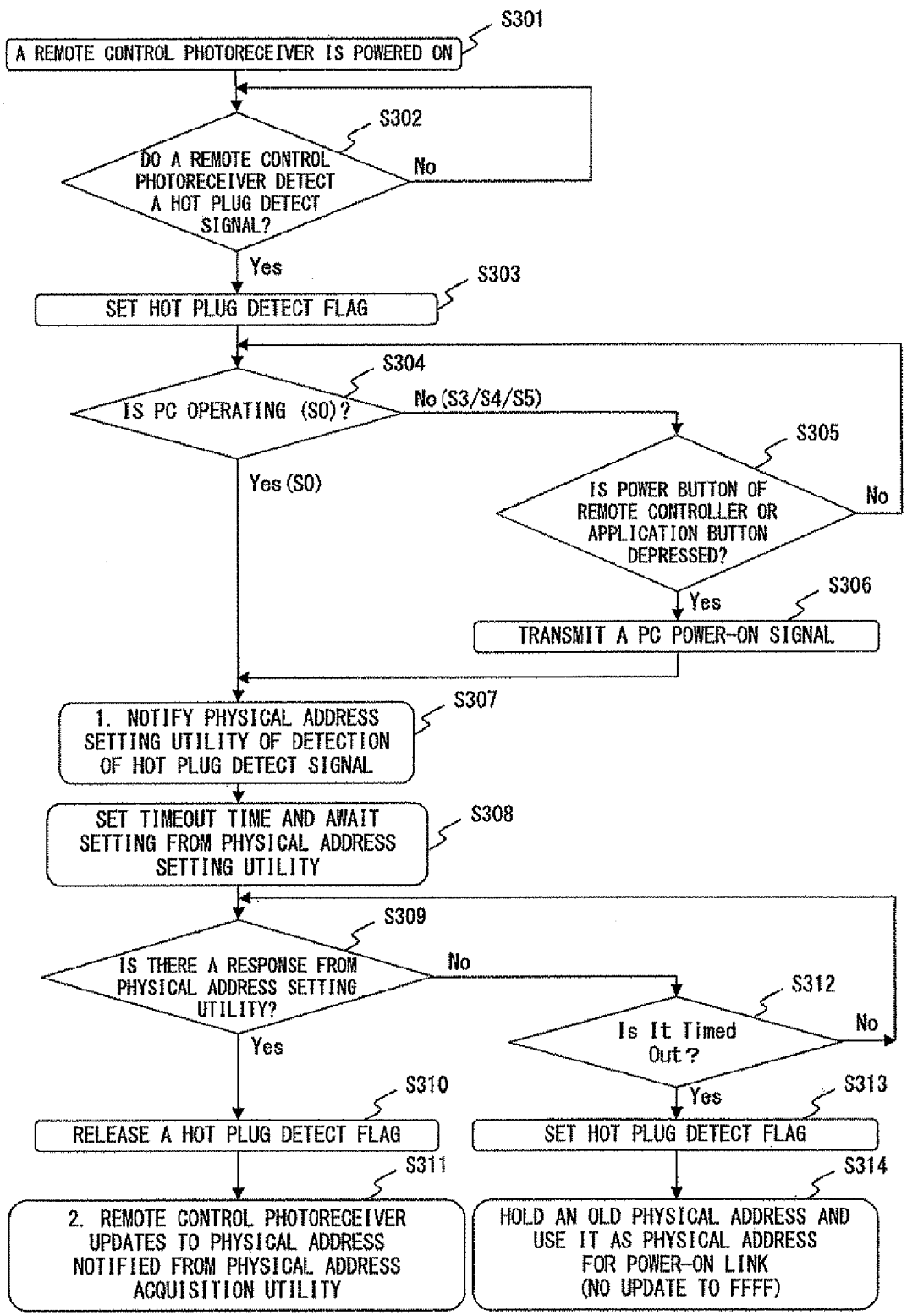
F I G. 6

INTERACTIVE CONTROL APPARATUS USING REMOTE CONTROL SIGNAL BETWEEN COMPUTER AND ELECTRIC HOME APPLIANCE

BACKGROUND OF THE INVENTION

1. Field of the Invention

The present invention relates to an Interactive control apparatus using a remote control signal between a computer and an electric home appliance so as to control the electric home appliance using a remote control signal transmitted by an application loaded into the computer, meanwhile to control the computer using a remote control signal transmitted by the electric home appliance.

2. Description of the Related Art

Conventionally, there has been a method of remotely operating an electric home appliance only by allowing a remote controller to directly perform a remote control operation of the electric home appliance such as an IR (infrared) remote control transmitter, a learning remote controller, a preset remote controller, etc.

However, there has recently been an interface standard called an HDMI (high-definition multimedia interface) for use in connecting a TV (television) to an AV (audio/video) equipment unit.

Since the HDMI standards are capable of inputting/outputting an electric home appliance control signal for CEC (consumer electric control) as well as video and audio, it is considered that a connection can be easily made and easy processing can be performed using only one cable.

FIG. 1 shows the concept of connecting a plurality of electric home appliances via one cable of the conventional HDMI standards. As shown in FIG. 1, a television 1, a hard disk recorder 2, and another AV equipment unit 3 are serially connected via one cable 4 of the HDMI standards. In FIG. 1, a serial connection is made, but a parallel connection can also be realized.

As a control device of the HDMI standards, a control device of what is called HDMI-CEC link standards, that is, a small device build on one chip including an AV control circuit and an electric home appliance control circuit, is loaded into an electric home appliance such as a television, an HD (hard disk) recorder, a stereo amplifier, etc.

Then, using the control of the HDMI-CEC link standards loaded into another electric home appliance, a menu is called on the television screen by the remote control operation of a television and the menu is sequentially selected, and a video recorder connected to the television can be controlled.

Additionally, an information processing device has been developed by considering the difference in use mode depending on the distance between a television and a PC (personal computer) such that an image memory controller and an interlaced scanning image memory controller can be provided as independent units to separate a controller for a television from a controller for a PC, and the switching control can be performed by an operation of the PC (for example, patent document 1).

In addition, there is a TV tuner control system disclosed as connecting a TV tuner provided with a remote control photoreceiving unit to a PC, providing a remote control transmitter, issuing an instruction to the TV tuner through the remote control photoreceiving unit using a control light signal from the PC or a control light signal from the remote control transmitter, and controlling a TV image displayed on the display unit of the PC by the microcomputer provided for the TV tuner, thereby reducing the operation buttons from the TV tuner.

In the TV tuner control system, an erroneous operation can be prevented by providing microcomputer control for the TV tuner even when the control light signal from the PC and the control light signal from the remote control transmitter are simultaneously transmitted (for example, patent document 2).

Furthermore, there is a PC system disclosed as using an available TV channel for a user who is not familiar with an operation of a PC and the OS (operating system), allowing the PC to activate an arbitrary application from the remote controller of a TV, switching an operation of the application by the PC to a broadcast signal corresponding to an available channel of the TV and outputting it to the TV (for example, patent document 3).

However, the information processing device according to the patent document 1 can switch the switching control of the screen of the TV monitor in cooperation with an event of the PC, but the PC cannot be controlled from the monitor.

That is, the system cannot perform interactive communications, and is not in accordance with the HDMI-CEC link standards. In addition, while the TV is operated by the PC, the PC cannot turn on or off the TV by transmitting a control signal from the PC.

Furthermore, the TV tuner control system according to the patent document 2 is a method of controlling a TV tuner for displaying a TV image on the monitor screen provided for the PC, and the PC cannot control the TV provided separate from the PC.

In addition, PC cannot be controlled from the TV monitor. That is, the system is not in accordance with the HDMI-CEC link standards.

The PC system according to the patent document 3 only displays an image of the application to be displayed on the monitor screen of the PC on the TV monitor screen for substitute using an available channel of the TV.

That is, the system does not control the operation of the PC of switching the actual channel of the PC. The PC system according to the patent document 3 is not in accordance with the HDMI-CEC link standards.

A small control device of the HDMI-CEC link standards built on one chip and loaded into an electric home appliance is only a practical device operated using a part of a processing function in the range determined by the HDMI-CEC link standards, operates with an electric home appliance of the same manufacturer, but does not always operate with an electric home appliance of another manufacturer.

Therefore, different standards and functions are practically applied by various manufacturers of electric home appliances, and it is not convenient in practical use.

Since a personal computer (hereinafter referred to as a PC) is provided with a CPU (central processing unit) having a high level calculating capability, it is expected to be able to control electric home appliances.

However, at present, a platform as an environment of the software and hardware as a base of a PC system can only control audio and video (AV control), and there has no personal computer provided with a controller for controlling electric home appliances.

If the above-mentioned one-chip HDMI-CEC is incorporated into a PC, the PC can logically control an electric home appliance.

However, since the current PC is provided with a circuit having the function of performing AV control, even if incorporating an HDMI-CEC chip, the former function in an AV control function and an electric home appliance control function become a redundant function for PC.

Therefore, the double loading of similar functions requires a laborious implementation of software for controlling the HDMI-CEC chip, and its operation is not so simple.

In the part of AV control function as a redundant function for the PC, the HDMI-CEC chip is uneconomical.

Furthermore, using an HDMI-CEC chip is to use an HDMI-CEC chip as is, and there is no room for improvement.

The merit of a PC resides in the flexibility of a system whose application can be easily improved or exchanged. When an HDMI-CEC chip is used in a PC, the function of the HDMI-CEC cannot be improved, and the flexibility is degenerated.

[Patent Document 1] Japanese Published Patent Application No. H10-133636

[Patent Document 2] Japanese Published Patent Application No. H9-311750

[Patent Document 3] Japanese Published Patent Application No. H11-015590

SUMMARY OF THE INVENTION

The present invention has been developed to solve the above-mentioned problems with the conventional techniques, and aims at providing an electric home appliance control apparatus in accordance with the HDMI-CEC link standards using a remote control signal so that power supply control and screen display control can be flexibly performed from a PC to a TV, and power supply control and PC application control can be performed from the TV to the PC.

First, the interactive control apparatus according to the first invention using a remote control signal between a computer and an external device has the computer having a unit for controlling an external device and connected to an external device via a cable through the unit for controlling an external device. With the configuration, an external device control command generated by the unit for controlling an external device and based on an instruction input from a human interface device, is transmitted to the external device in order to remotely control the external device. The external device is, for example, an electric home appliance.

In the interactive control apparatus, for example, the unit for controlling an external device is comprised of an application for controlling the external device and an interactive interface unit, and the human interface device includes a keyboard input key, a pointing device, or a remote controller.

When the computer is not powered on, a controller capable of operating on a standby power supply state in the computer receives a power-on signal code or a code for activating an application, which transmitted by the remote controller thereby being capable of activating the computer.

Next, an interactive control apparatus using a remote control signal between a computer and an external device according to the second invention includes a computer which is provided with an application for controlling external device and an interactive interface unit, and is connected to an external device via a cable. With the configuration, when both the external device and the computer are powered on, and a computer control signal transmitted from the external device is received by the interactive interface unit, an operation corresponding to a computer control command included in the computer control signal is executed by the external device control application. The external device is, for example, an electric home appliance.

In the interactive control apparatus, for example, when the operation corresponding to the computer control command is executed, the operation is executed by activating the external device control application itself or by activating another application.

In the interactive control apparatus according to the first or second invention, for example, the computer is provided with a GPI (general purpose input) which is connected to an external device link control unit operated by the external device control application through hardware, and can transmit a power on/off signal and an event signal. When the external device is powered on and any application is activated in the computer, and in case that the external device transmits a computer control signal for powering off the computer, the external device link control unit directly executes power-off command on the GPI in the computer.

Furthermore, a recording medium according to the third invention stores a computer-readable program used to direct a computer which has a unit for controlling an external device and is connected to an external device via a cable through the unit for controlling an external device, to remotely control the external device due to transmitting an external device control command generated by the unit for controlling an external device and based on an instruction input from a human interface device to the external device through the unit for controlling an external device, and perform interactive control using a remote control signal between the computer and the external device.

Then, a recording medium according to the fourth invention stores a computer-readable program used to direct a computer which is provided with an application for controlling external device and an interactive interface unit, and the interactive interface unit is connected to an external device via a cable. With the program, when both the external device and the computer are powered on, and in case that a computer control signal transmitted from the external device is received by the interactive interface unit, an operation corresponding to a computer control command included in the computer control signal is executed by the application for controlling external device.

According to the present invention, since the unit for controlling an external device provided for the computer is connected to the external device via a cable, an interactive control apparatus using a remote control signal can be variously structured with a computer and an external device by adding a corresponding equipment unit connected via a cable or by additionally connecting an external device produced by a different company due to update of an application for controlling a unit for controlling an external device.

BRIEF DESCRIPTION OF THE DRAWINGS

FIG. 2 shows the configuration of the interactive control apparatus using a remote control signal between a computer and an electric home appliance according to a mode for embodying the present invention;

FIG. 3 is a flowchart for the process of controlling a power supply of a TV from a personal computer;

FIG. 5 is a flowchart for explanation of the operation of the physical address acquisition utility when the personal computer is operating according to the embodiment 2; and FIG. 6 is a flowchart for explanation of acquiring and setting a physical address when the electric home appliance link unit of the personal computer is powered on according to the embodiment 2.

DESCRIPTION OF THE PREFERRED EMBODIMENTS

Figure 1:
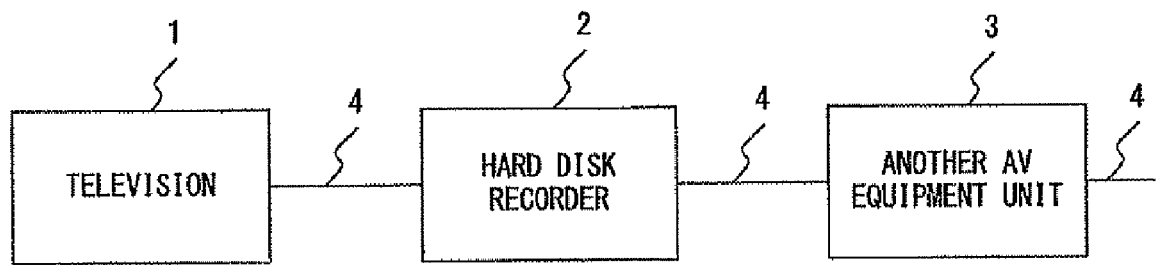
FIG. 1 shows the concept of the circumstance in which a plurality of electric home appliances are connected via a conventional cable of HDMI standards.

The modes for embodying the present invention are described below in detail with reference to the attached drawings.

First Embodiment

FIG. 2 shows the configuration of the interactive control apparatus using a remote control signal between a computer and an electric home appliance according to a mode for embodying the present invention. FIG. 2 shows a personal computer 5 as an example of a computer. It is obvious that a common computer or a terminal device can be used.

FIG. 2 also shows an electric home appliance, and especially a television 6 as an example of an external device. The television 6 is an example of an electric home appliance, and can be replaced with any electric home appliance provided with an interactive interface unit in accordance with the CED (consumer electronics control) standards of the HDMI (high-definition multimedia interface), for example, an HD (hard disk) recorder, stereo amplifier, etc. Any external device other than electric home appliances can also be used.

The interactive control apparatus using a remote control signal between the computer and the electric home appliance shown in FIG. 2 has the personal computer 5 connected to the television 6 via a cable 7.

In the example shown in FIG. 2, the television 6 includes at least a display screen 8, a remote controlling photoreceiver 9, and an HDMI unit connector 10 as an interactive interface. It also includes a TV remote controller 11 as a standard accessory. One terminal of the cable 7 is connected to the HDMI unit connector 10.

The personal computer 5 is divided into a main board 12 for outputting graphics and voice and an electric home appliance link unit 13 for performing CEC control as main parts of the configuration. Other circuit configurations including the CPU are omitted in FIG. 2.

The above-mentioned main board 12 is provided with at least an HDMI unit connector 14, a CEC unit connector 15, a chip set 16, and a USB power supply connector 17.

The chip set 16 includes chips of a USB data processing unit 18, a GPI (general purpose input) unit 19, and a graphic unit 21.

The HDMI unit connector 14 is connected to the CEC unit connector 15 via a signal line a, and to the graphic unit 21 of the chip set 16 via a signal line b. Furthermore, the other terminal of the cable 7 is connected to the HDMI unit connector 14.

The USB power supply connector 17 is connected to the USB data processing unit 18 of the chip set 16 and the GPI unit 19.

The electric home appliance link unit 13 is provided with a USB/CEC power-on signal connector 25, a photoreceiver controller 24, a photoreceiving element 22, etc. One of the photoreceiver controller 24 is connected to the photoreceiving element 22, and the other is connected to the USE/CEC power-on signal connector 25.

The above-mentioned HDMI unit connector 14 detects the attachment and detachment of the cable 7. The detected attachment/detachment signal is transmitted to the CEC unit connector 15 and the graphic unit 21.

A TV control signal generated by operating an input key of the keyboard not shown in the attached drawings as a human interface device of the personal computer 5, a mouse connected to the keyboard or the body, and a stick-type or flat-type pointing device is converted into a TV remote control signal by the CEC unit connector 15, and transmitted to the HDMI unit connector 14.

The TV remote control signal includes a physical address of the television 6, and an operation code requesting power-on/off of the TV, or a switch of the TV screen, etc. The HDMI unit connector 14 outputs the TV remote control signal received from the CEC unit connector 15 to the television 6 via the cable 7.

Similarly, a PC remote control signal input to the photoreceiving element 22 from a PC remote controller 23 of the electric home appliance link unit 13 as a human interface device is analyzed by the photoreceiver controller 24.

A TV control signal is converted into a TV remote control signal, and output to the television 6 through the USE/CEC power-on signal connector 25, the HDMI unit connector 14, and the cable 7.

If the signal input from the PC remote controller 23 is a control signal for internal processing of the personal computer 5, it is converted into an USB standard signal, and is transmitted to the USE data processing unit 18 through the USE/CEC power-on signal connector 25, the USB power supply connector 17, and the GPI unit 19. Thus, an internal process is performed by a normal personal computer.

On the other hand, the television 5 transmits the signal from the TV remote controller 11 to the HDMI unit connector 14 of the personal computer 5 through the remote controlling photoreceiver 9, the HMDI controller not shown in the attached drawings, the HDMI unit connector 10, and the cable 7.

The HDMI unit connector 14 receives the transmission, and the received signal is transmitted to the CEC unit connector 15 through a signal line a.

The CEC unit connector 15 is a component for managing various electric home appliances by a physical address. The CEC unit connector 15 identifies and manages each electric home appliance by a physical address regardless of the manufacturer of electric home appliances, such as "01" means a TV and "02" means an HD recorder.

Furthermore, the controller stores a command transmitted from the television 6 in the buffer not shown in the attached drawings when the television 6 is powered on and the personal computer 5 is not powered on, activates the personal computer 5, acquires the command stored in the buffer, and allows the application corresponding to the command of the personal computer 5 to execute the operation corresponding to the command.

The CEC unit connector 15 notifies the USB/CEC power-on signal connector 25 of the signal received from the HDMI unit connector 14.

The USB/CEC power-on signal connector 25 converts the signal to a code of the USB standard, and notifies the USB data processing unit 18 of the code via the USE power supply connector 17.

The USB data processing unit 18 performs an internal process according to the signal converted into the code of the USB standard.

FIG. 3 is a flowchart of the process of controlling the power supply of the television 6 from the personal computer 5. The process is performed by a controller capable of operating on a standby power supply state when the personal computer 5 is not powered on in itself.

Generally, the power button provided for the remote controller functions such that the equipment can be powered on if it is depressed when the equipment is powered off, and the equipment can be powered off or enter the standby state if it is depressed when the equipment is powered up.

In FIG. 3, when the TV power button of the PC remote controller 23 is depressed (step S1), it is determined whether or not the CEC link setting is valid (step S2).

This determining process is performed by referring to the contents set in advance by the CEC control program. The setting is made on the input screen having the function of linking the TV compatible with the HDMI-CEC to the personal computer 5.

The setting is made whether or not, for example, input is to be switched when the personal computer is manually operated while watching the TV, the status of the personal computer is to be displayed on the OSD of the TV, the TV is switched to the standby state when the personal computer is shut down, the model of the TV is selected from the list displayed on the screen, a physical address has been assigned when the model is selected, etc.

When the CEC link setting is not performed in the determination in step S2 above (NO in S2), control is returned to the normal process of a controller (step S11).

If the CEC link setting is performed in the determination in step S2 (YES in S2), then it is further determined whether or not the television compatible with the CEC is connected to the personal computer 5 (step S3).

This process is to check whether or not the signal input through the HDMI unit connector 14, the CEC unit connector 15, the USB/CEC power-on signal connector 25, the USB power supply connector 17, and the GPI unit 19 indicates that the television 6 is connected to the HDMI unit connector 14 via the cable 7.

Then, if it is determined that the television 6 compatible with the CEC is not connected to the personal computer 5 (NO in S3), control is returned to the normal process of a controller (step S11).

On the other hand, if it is determined that the television 6 compatible with the CEC is connected to the personal computer 5 (YES in S3), then it is determined whether or not the television 6 is powered off (step S4).

If the television 6 is powered off (YES in S4), a power-on command is transmitted to the television 6 (step S5), and the system waits until the television 6 is powered on (NO in step S6).

When it is confirmed that the television 6 has been powered on (YES in S6), it is determined whether or not the personal computer 5 has been powered off (step S7). When it is powered off (YES in S7), the personal computer 5 is powered on (step S8), and control is returned to the normal process of a controller (step S11).

When it is determined in step S4 that the television 6 is powered on (NO in S4), a standby command or a power-off command is transmitted to the television 6 (step S9), and the system waits until the television 6 enters the standby state or it is powered off (NO in step S10).

If it is confirmed that the television 6 has entered the standby state or has been powered off (YES in S10), control is returned to the normal process of a controller (step S11).

Thus, regardless of whether or not the personal computer 5 is activated, when the PC remote controller 23 is operated, the controller capable of operating by a standby power supply powers on, enters a standby state, or powers off the television 6 by the remote control application.

When the powered-off television 6 is powered on, the television 6 is entered in a state in which it can be remotely controlled with the powered-on personal computer 5 as is or with the powered-off personal computer 5 powered on.

In the explanation above, the PC remote controller 23 is described as a human interface device for powering on or off the television 6. However, it is also possible to allow the remote control application to transmit a TV power-on/off command by operating an input key of the keyboard, a mouse connected to the keyboard or the body, or a stick-type or a flat-type pointing device as described above without operating the power button of the PC remote controller 23.

Figure 4:
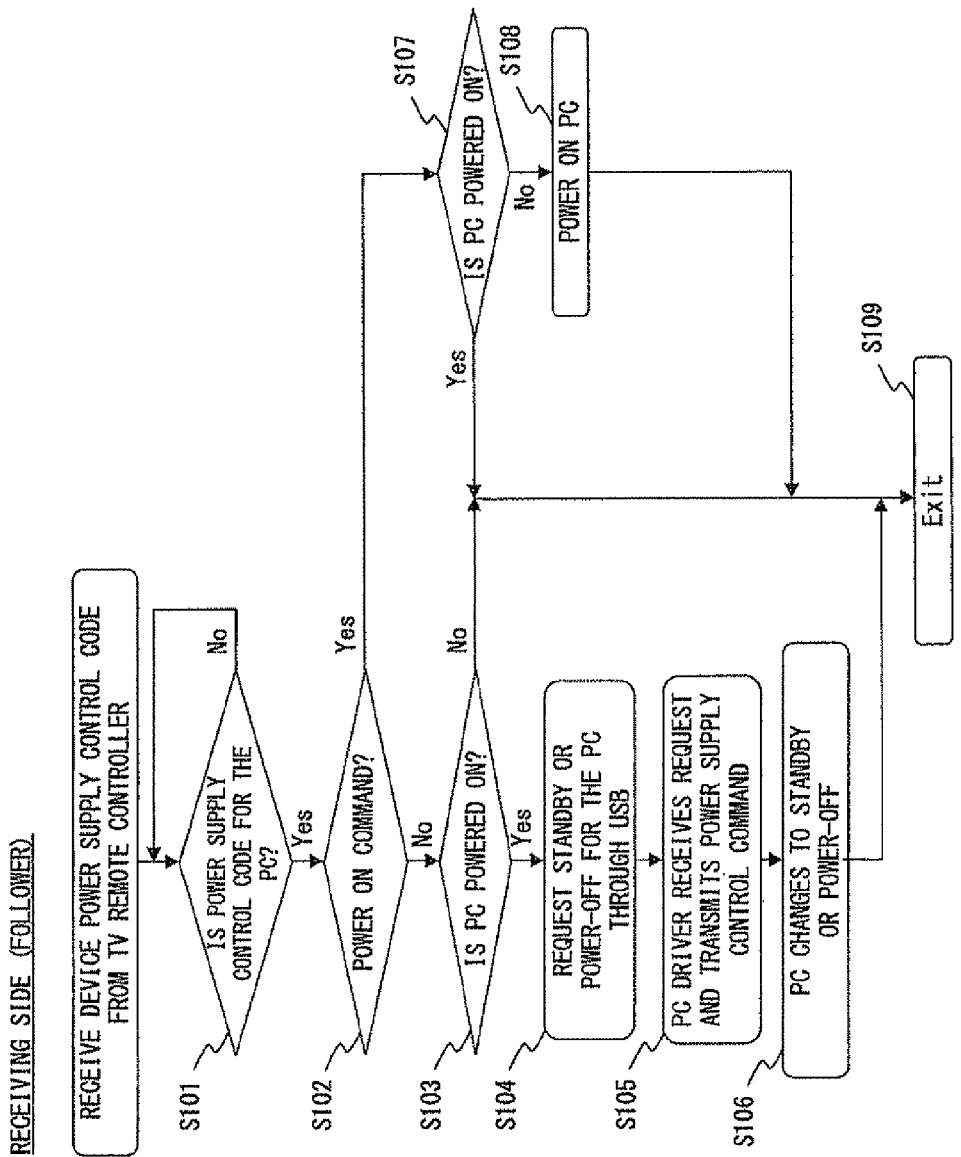
FIG. 4 is a flowchart for the process of controlling a power supply of a personal computer from a TV.

FIG. 4 is a flowchart of the process of controlling the power supply of the personal computer 5 from the television 6. This process is also performed by a controller capable of operating on a standby power supply state when the personal computer 5 is not powered on in itself.

In FIG. 4, a power supply control code of the device is received from the TV remote controller 11, and it is determined whether or not it is the power supply control code for the PC itself (step S101).

If it is not a power supply control code for the PC (NO in S101), the system waits until the power supply control code for the PC is input. If the power supply control code for the PC is input (YES in S101), then it is determined whether or not the power supply control code is a power-on command (step S102).

If it is a power-on command (YES in S102), then it is checked whether or not the PC is powered on (step S107). If it is powered on (YES in S107), then no operation is performed, and control is returned to the normal process of a controller (step S109).

If it is determined in step S107 that the PC is not powered on (NO in S107), the PC is in the standby state or powered off. Therefore, in this case, the PC is powered on (step S108), and control is returned to the normal process of a controller (step S109).

If it is determined in step S102 that the code is not a power-on command, that is, a standby or power-off command (NO in S102), then it is checked whether or not the PC is powered on (step S103).

If the PC is not powered on (NO in S103), the PC is in the standby state or powered off. That is, the PC is in the state indicated by the power supply control code, and no operation is performed in this case, and control is returned to the normal process of a controller (step S109).

If it is determined in step S103 that the PC is powered on (YES in S103), then the USB data processing unit 18 converts the power supply control code into a USB code, and transmits a request to enter the PC in the standby state or to power it off through the USB circuit (S104).

The request for standby or power-off is received by the driver of the PC, and a power supply control code is transmitted (step S105).

Thus, the personal computer 5 enters a standby or power off state (S106). Then, the controller returns to the normal process (step S109).

In the explanation above, the control of the power supply is described, but the present invention is not limited to this application. When the television 6 is powered on, for example, video data is recorded on an HD player of TV from the personal computer 5 through an electric home appliance control application. It is possible to allow the television 6 to execute various operations such as recording the music played on the music program of the television 6, etc.

Second Embodiment

Described next is a process of acquiring the physical address of an electric home appliance by the PC (including the electric home appliance link unit 13), and setting the acquired physical address on the PC itself.

The personal computer 5 according to the present embodiment is provided with a controller not shown in the attached drawings but operated by a standby power supply. The controller is configured to identify a Hot Plug Detect signal for detection of the presence/absence of a display.

The main board 12 of the personal computer 5 according to the present embodiment has a physical address acquisition utility in a predetermined storage area of the memory not shown in the attached drawings.

The above-mentioned controller monitors the Hot Plug Detect signal and checks whether or not the television 6 is connected to the HDMI unit connector 14 via the cable 7.

When the Hot Plug Detect signal is detected, a physical address is acquired from the E-EDID (Enhanced Extended Display Interface Data) of the television 6 stored in the television 6 as the information about the television 6 by the physical address acquisition utility before controlling the television 6. The acquired physical address is stored in a predetermined storage area in the memory built in the photoreceiver controller 24, but not shown in the attached drawings.

FIG. 5 is a flowchart for explanation of the operation of the physical address acquisition utility of the personal computer 5 operating as described above according to the embodiment 2.

In FIG. 5, if the Windows OS of the personal computer 5 is activated, or control is returned from step S3 or S4 of the process shown in FIG. 3, the physical address acquisition utility is first activated (step S201). Next, the physical address acquisition utility inquire for the above-mentioned controller capable of operating by a standby power supply state whether or not the Hot Plug Detect signal has been detected (step S202).

If the Hot Plug Detect signal has not been detected (NO in S202), then it is determined whether or not the electric home appliance link unit 13 (hereinafter referred to as a remote control photoreceiver 13) has transmitted a detection notification of the Hot Plug Detect signal to the physical address acquisition utility (step S203).

If there is no detection notification of the Hot Plug Detect signal, then control is returned to the determining process in step S202, and the processes in steps S202 and S203 are repeated.

If the Hot Plug Detect signal is detected in the determining process in step S202 (YES in S202), or the detection of the Hot Plug Detect signal is notified in the determining process in step S203 (YES in S203), then the physical address is to be acquired from the E-EDID of the television 6 connected to the HDMI unit connector 14 (step S204).

Then, it is determined whether or not the physical address has been correctly acquired (step S205). If it has been successfully acquired (YES in S205), then the successfully acquired physical address is set in the photoreceiver controller 24 (step S207). The setting process is to notify the remote control photoreceiver 13 of the physical address.

Then, the remote control photoreceiver 13 updates the physical address stored in the electric home appliance physical address storage area in memory of the photoreceiver controller 24 not shown in the attached drawings to the physical address notified from the physical address acquisition utility (step S208).

If it is determined in step S205 that the physical address has not been correctly acquired, that is, if the acquisition of the physical address has failed (NO in S205), then a notification for setting a physical address "FFFF" (non-processed data) is transmitted to the photoreceiver controller of the remote control photoreceiver 13 (step S206), and control is passed to step S208.

In this case, the remote control photoreceiver 13 updates the physical address stored in the electric home appliance physical address storage area in memory of the photoreceiver controller 24 to "FFFF" in step S208.

Described above is the process relating to the acquisition of the physical address of an electric home appliance when the personal computer 5 is activated, and described below is the process relating to the acquisition of the physical address of an electric home appliance by the photoreceiver controller 24 when the remote control photoreceiver 13 is powered on regardless of whether PC is activated or not activated.

FIG. 6 is a flowchart for explanation of acquiring and setting a physical address when the electric home appliance link unit (remote control photoreceiver) 13 of the personal computer 5 is powered on according to the embodiment 2.

In FIG. 6, when the remote control photoreceiver 13 is powered on (step S301), the photoreceiver controller 24 first determines whether or not the remote control photoreceiver 13 has detected the Hot Plug Detect signal (step S302).

The process is to determine whether or not the Hot Plug Detect signal has been input (detected) from the television 6 through the USB/CEC power-on signal connector 25, and the CEC unit connector 15 and the HDMI unit connector 14 of the main board 12 of the personal computer 5.

If the Hot Plug Detect signal has not been detected (NO in S302), then the system waits until it is detected. If the Hot Plug Detect signal is detected (YES in S302), then a Hot Plug Detect flag is set in a predetermined flag area of the memory built in the remote control photoreceiver 13 itself (step S303).

Next, the photoreceiver controller 24 determines whether or not the personal computer 5 is in the operating state (step S304). Unless the personal computer 5 is in the operating state (NO in S304), then it is determined whether or not the power button of the PC remote controller 23 or the application button has been depressed (step S305).

If no event signal has been input from the remote controller 23 for the photoreceiver controller 24 (NO in S305), control is returned to step S304, and the photoreceiver controller 24 repeats the processes in steps S304 and S305.

If it is determined in the determining process in step S304 that the personal computer 5 is in the operating state (YES in S304), or if it is determined in the determining process in step S305 that the event signal has been input (YES in S305) and a power-on signal is transmitted to the personal computer 5 in response to the determination (step S306), then the physical address acquisition utility is notified of the detection of the Hot Plug Detect signal (step S307).

Then, the photoreceiver controller 24 sets the time to a timeout in the timer not shown in the attached drawings, and notifies the physical address acquisition utility about awaiting a setting notification of physical address from the physical address acquisition utility (step S308).

Then, the response from the physical address acquisition utility is awaited (step S309). If the response of the setting of the physical address is received from the physical address acquisition utility (YES in S309), then the Hot Plug Detect flag set in the flag area in the process in step S303 is released (step S310).

Next, the photoreceiver controller 24 updates the physical address stored in the electric home appliance physical address storage area in memory of photoreceiver controller 24 not shown in the attached drawings to the physical address notified from the physical address acquisition utility (step S311).

If there is no response from the physical address acquisition utility in the process of awaiting the response in step S308 (NO in S309), then it is determined whether or not the time by the timeout set in the timer has passed (step S312).

If the time by the timeout has not passed (NO in S312), then the determining processes in steps S309 and S312 are repeated.

If it is determined that the time by the timeout has passed in step S312 (YES in S312), then the Hot Plug Detect flag is set (step S313), the stored physical address is held as is, and the process terminates (S314).

The Hot Plug Detect flag set in the process of step S314 is to notify the personal computer 5 that the Hot Plug Detect signal has been detected when the operation of the personal computer 5 is started and the remote control photoreceiver 13 is referred to as in the process of step S203 shown in FIG. 5.

Holding an old address as is without updating the stored physical address to "FFFF" is to consider that, for instance, there is the possibility that the personal computer is not in the operating state, or the electric home appliance turns off the hot plug. Normally, in case that the hot plug is turned off, it means that the electric home appliance is not connected, and the remote control is not started.

However, since a electric home appliance may be connected when the hot plug is turned off, it is necessary to start the remote control. Even though photoreceiver controller 24 of the remote control photoreceiver 13 recognizes that the Hot Plug Detect signal is turned off, the photoreceiver controller 24 of the remote control photoreceiver 13 refers to the held physical address in cooperation with the power-on when the PC is powered on in itself, checks that the physical address is not "FFFF", and prepares a power-on command to be transmitted to the personal computer or the television as the similar operation of when an electric home appliance is connected.

What is claimed is:

1. An interactive control apparatus using a remote control signal with a computer having an external-device controlling unit and connected to an external device including an electric home appliance by an HDMI (High-Definition Multimedia Interface) cable through the external-device controlling unit, wherein
    an external device control command generated by the external-device controlling unit in accordance with an instruction input from a human interface device is transmitted to the external device to remotely control the external device;
    the computer transmits a power-on command to the external device before transmitting the external device control command if determined the computer is powered on in itself and the external device is not powered on, and
    in case that the computer is not powered on in itself, a controller operating under a standby power supply state in the computer receives a power-on signal code and a code for activation of an application transmitted by a remote controller, thereby activating the computer itself; and
    the computer further includes a remote control receiver, acquires a physical address stored in the external device and sets the physical address in the remote control receiver before controlling the external device.

2. An interactive control method using a remote control signal with a computer having an external-device controlling unit and connected to an external device including an electric home appliance via an HDMI (High-Definition Multimedia Interface) cable, wherein
    an external device control command generated by the external-device controlling unit in accordance with an instruction input from a human interface device is transmitted to the external device to remotely control the external device, and
    the computer includes a remote control receiver, acquires a physical address stored in the external device and sets the physical address in the remote control receiver before controlling the external device;
    wherein the computer transmits a power-on command to the external device before transmitting the external device control command if determined the computer is powered on in itself and the external device is not powered on, and
    in case that the computer is not powered on in itself, a controller operating under a standby power supply state in the computer receives a power-on signal code and a code for activation of an application transmitted by a remote controller, thereby activating the computer itself.

3. An interactive control apparatus using a remote control signal with a computer provided with an external-device control application and an interactive interface unit, and having the interactive interface unit connected to an external device including an electric home appliance via an HDMI (High-Definition Multimedia Interface) cable, wherein
    when both the external device and the computer are powered on, and a computer control signal transmitted from the external device is receive by the interactive interface unit, the external-device control application executes an operation corresponding to a computer control command included in the computer control signal, and
    the computer includes a remote control receiver, acquires a physical address stored in the external device and sets the physical address in the remote control receiver before controlling the external device;
    wherein the computer comprises a controller operating under a standby power supply state of the computer; and in case that the external device is powered on and the computer is not powered on, the controller stores a command transmitted from the external device in a buffer, activates the computer and then acquires the command stored in the buffer; therewith allows the application corresponding to the command of the computer to execute the operation corresponding to the command;
    wherein the computer further comprises a GPI (General Purpose Input) which is connected to an external device link control unit operating by the external-device control application through hardware, and can transmit a notification of a power-on/off signal or an event signal; and when the external device is powered on and any application is activated in the computer, and when a computer control signal of computer power-off is transmitted from the external device, the external device link control unit directly executes the computer power-off command on the GPI.

4. An interactive control method using a remote control signal with a computer provided with an external-device control application and an interactive interface unit, and having the interactive interface unit connected to an external device including an electric home appliance via an HDMI (High-Definition Multimedia Interface) cable, wherein in case that both the external device and the computer are powered on, and a computer control signal transmitted from the external device is received by the interactive interface unit, the external-device control application performs an operation corresponding to a computer control command included in the computer control signal, and the computer includes a remote control receiver, acquires a physical address stored in the external device and sets the physical address in the remote control receiver before controlling the external device;

wherein the computer comprises a controller operating under a standby power supply state of the computer; and in case that the external device is powered on and the computer is not powered on, the controller stores a command transmitted from the external device in a buffer, activates the computer and then acquires the command stored in the buffer; therewith allows the application corresponding to the command of the computer to execute the operation corresponding to the command;

wherein the computer further comprises a GPI (General Purpose Input) which is connected to an external device link control unit operating by the external-device control application through hardware, and can transmit a notification of a power-on/off signal or an event signal; and when the external device is powered on and any application is activated in the computer, and when a computer control signal of computer power-off is transmitted from the external device, the external device link control unit directly executes the computer power-off command on the GPI.

5. The apparatus according to claim 1, wherein the external-device controlling unit includes an application for executing external device control and an interactive interface unit, and the human interface device includes a keyboard input key, a pointing device, or a remote controller.

6. The apparatus according to claim 5, wherein the application executes control of the external device operating in accordance with a CEC (Consumer Electric Control) standard, and the interactive interface unit is in accordance with a CEC (Consumer Electronics Control) standard of an HDMI (High Definition Multimedia Interface).

7. The apparatus according to claim 3, wherein the external-device control application executes control of an external device operating in accordance with a CEC (Consumer Electric Control) standard, and the interactive interface unit is in accordance with a CEC (Consumer Electronics Control) standard of an HDMI (High Definition Multimedia Interface).

8. The apparatus according to claim 3, wherein when an operation corresponding to the computer control command is performed, the external-device control application executes the operation by the application itself of by activating another application.

9. The apparatus according to claim 3, wherein the remote control receiver is separate from a portion for outputting graphics and voice, the controller acquires the physical address stored in the external device as information about the external device by a physical address acquisition utility before controlling the external device.

10. The apparatus according to claim 3, wherein the remote control receiver performs CEC control, and the physical address is acquired from an E-EDID (Enhanced Extended Display Interface Data) stored in the external device.

11. The apparatus according to claim 10, wherein the computer has the controller identifying a Hot Plug Detect signal for detection of presence/absence of a display, allows the physical address acquisition utility to read the E-EDID of the display when the Hot Plug Detect signal is detected, and sets the physical address in the remote control receiver.

12. The apparatus according to claim 10, wherein the remote control receiver comprises firmware identifying a Hot Plug Detect signal for detection of presence/absence of a display, and the firmware temporarily releases the set physical address when the HOT Plug Detect signal is detected in case that the computer is not powered on.

13. The method according to claim 4, wherein the external-device control application executes control of an external device operating in accordance with a CEC (Consumer Electronic Controller) standard, and the interactive interface unit is in accordance with a CEC (Consumer Electronic Control) standard of an HDMI (High Definition Multimedia Interface).

14. The method according to claim 4, wherein when an operation corresponding to the computer control command is performed, the external-device control application executes the operation by the application itself or by activating another application.

* * * * *